(12) United States Patent
Youn

(10) Patent No.: US 10,994,781 B2
(45) Date of Patent: May 4, 2021

(54) SYSTEM AND METHOD FOR AUTOMATIC ADJUSTMENT OF STEERING WHEEL

(71) Applicants: HYUNDAI MOTOR COMPANY, Seoul (KR); KIA MOTORS CORPORATION, Seoul (KR)

(72) Inventor: Su Jin Youn, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 274 days.

(21) Appl. No.: 16/175,055

(22) Filed: Oct. 30, 2018

(65) Prior Publication Data
US 2019/0270484 A1 Sep. 5, 2019

(30) Foreign Application Priority Data
Mar. 2, 2018 (KR) .................. 10-2018-0025212

(51) Int. Cl.
| | |
|---|---|
| G01M 17/00 | (2006.01) |
| G06F 7/00 | (2006.01) |
| G06F 11/30 | (2006.01) |
| G07C 5/00 | (2006.01) |
| B62D 15/02 | (2006.01) |
| B62D 5/04 | (2006.01) |
| G07C 5/08 | (2006.01) |

(52) U.S. Cl.
CPC ......... *B62D 15/0245* (2013.01); *B62D 5/049* (2013.01); *G07C 5/008* (2013.01); *G07C 5/08* (2013.01)

(58) Field of Classification Search
CPC ...... B62D 15/0245; B62D 5/049; B62D 5/04; G07C 5/008; G07C 5/08; B25J 13/08; B25J 18/00; B25J 15/02

USPC .................. 701/29.6; 700/259; 180/446
See application file for complete search history.

(56) References Cited

U.S. PATENT DOCUMENTS

| | | | |
|---|---|---|---|
| 2012/0061171 A1* | 3/2012 | Ellis .................. | B62D 1/10 180/446 |
| 2012/0143373 A1* | 6/2012 | Park .................. | G01B 11/272 700/259 |
| 2016/0335816 A1* | 11/2016 | Thoppae .............. | H04L 67/42 |

FOREIGN PATENT DOCUMENTS

| | | |
|---|---|---|
| KR | 10-0738469 B | 7/2007 |
| KR | 10-0774669 B | 11/2007 |
| KR | 10-1610406 B | 4/2016 |

* cited by examiner

*Primary Examiner* — Mahmoud S Ismail
(74) *Attorney, Agent, or Firm* — Brinks Gilson & Lione

(57) ABSTRACT

Disclosed is an automatic adjustment system for a steering wheel provided in a process line to support wheel alignment operation of a vehicle mounted with an OBD, includes a scanner for recognizing a vehicle identification number entered into the process line; an antenna that connects the OBD of the vehicle with the wireless diagnosis communication to transmit and receive data; a robot moves a vision sensor mounted on the front end portion thereof to the shooting position of the steering wheel in the vehicle through the attitude control, when the vehicle is seated in a centering position; and a control apparatus that analyzes the shooting image of the vision sensor to calculate the current distorted angle of the steering wheel and initialize by inputting the current distorted angle of the steering wheel to the steering angle sensor via the diagnosis communication connected with the OBD of the vehicle.

15 Claims, 7 Drawing Sheets

<DISTORED STATE OF STEERING WHEEL>

<CORRECTION STATE OF STEERING WHEEL>

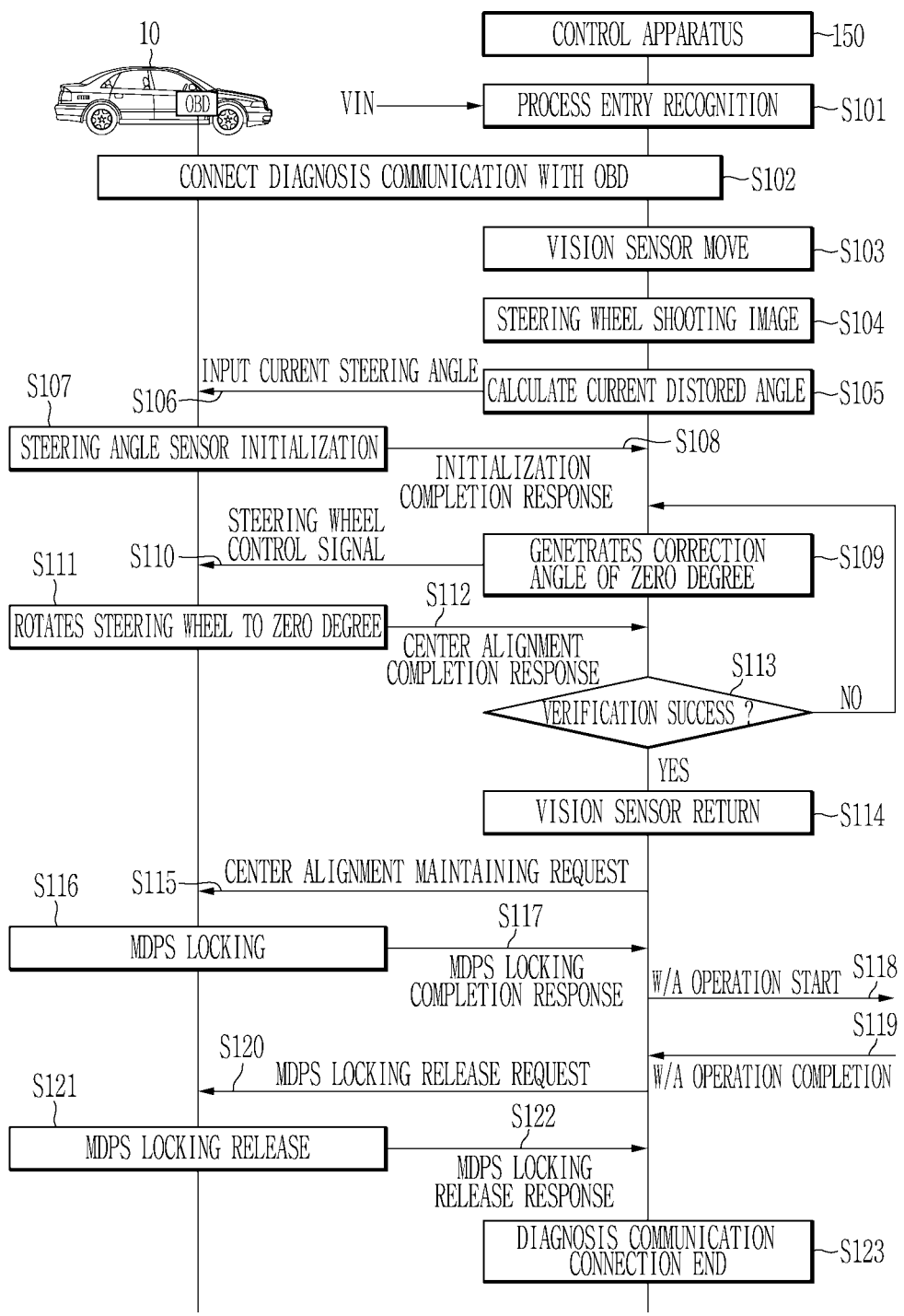

SYSTEM AND METHOD FOR AUTOMATIC ADJUSTMENT OF STEERING WHEEL

CROSS-REFERENCE TO RELATED APPLICATION

The present application claims priority to and the benefit of Korean Patent Application No. 10-2018-0025212 filed on Mar. 2, 2018, which is incorporated herein by reference in its entirety.

FIELD

The present disclosure relates to a system and method for automatic adjustment of a steering wheel, and more particularly, the present disclosure relates to a system and method for automatic adjustment of a steering wheel which allows a steering angle and center alignment of a steering wheel to be automatically adjusted in the manufacturing process of a vehicle.

BACKGROUND

The statements in this section merely provide background information related to the present disclosure and may not constitute prior art.

Generally, a wheel alignment operation is carried out at the vehicle assembled at the factory. To do this, a steering wheel leveling operation is first performed, which adjusts the steering angle of the steering wheel to zero degree to align the center of the steering wheel.

For example, FIG. 1 shows the process flow for a conventional wheel alignment work.

Referring to FIG. 1, conventional wheel alignment works perform the steering leveling works including the steps of entering the vehicle into the process line at step S1, installing a wheel leveler for an angle measure on a steering wheel of a vehicle at step S2, manually adjusting the steering wheel to center-align at zero degree and fixing it at step S3, and initializing the steering angle sensor in the center alignment state S4. Thereafter, in a state of fixing the wheel leveler, the steps of adjusting toe and camber angle of each wheel S5, and removing the wheel leveler to get the vehicle out S6 may be further included.

However, since the conventional wheel alignment operation requires a process of mounting and removing the wheel leveler on the steering wheel for each vehicle in order to measure the current steering angle of the steering wheel of the vehicle, there is a drawback that increases working time, workload and cost.

Furthermore, since worker should manually align the steering wheel at 0 degree while looking at the angle display screen connected with the wheel leveler and the initialization operation of inputting the reference (0 degree) of the steering angle sensor also depends on the worker, there is a problem that the wheel alignment quality of the vehicle is deteriorated due to human error.

The above information disclosed in this Background section is only for enhancement of understanding of the background of the disclosure and therefore it may contain information that does not form the prior art that is already known in this country to a person of ordinary skill in the art.

SUMMARY

One aspect of the present disclosure is to provide a system and method for automatic adjustment of a steering wheel for directly inputting a distorted angle of a steering wheel detected through a vision sensor portion of a robot tip to a steering angle sensor and correcting the steering angle sensor.

Another aspect of the present disclosure is to provide a system and method for automatic adjustment of a steering wheel for maintaining the center alignment during the wheel alignment operation time by rotating the steering wheel by the distorted angle through the control of the MDPS.

An automatic adjustment system for a steering wheel according to one aspect of the present disclosure provided in a process line to support wheel alignment operation of a vehicle on which an OBD is mounted, may include a scanner for recognizing a vehicle identification number entered into the process line; an antenna that connects the OBD of the vehicle with the wireless diagnosis communication to transmit and receive data; a robot that moves a vision sensor mounted on the front end portion thereof to the shooting position of the steering wheel in the vehicle through the attitude control when the vehicle is seated in a centering position; and a control apparatus that analyzes the shooting image of the vision sensor to calculate the current distorted angle of the steering wheel and correct the steering angle sensor the steering wheel by inputting the current distorted angle of the steering wheel to the steering angle sensor via the diagnosis communication connected with the OBD of the vehicle.

The control apparatus may generate a correction angle of the current distorted angle, and rotate the steering wheel through a MDPS (motor driving power steering) control of the vehicle and center-aligns the steering wheel to zero degree.

The control apparatus may lock the MDPS during the wheel alignment operation of the vehicle to maintain the center alignment state.

The control apparatus may include a communication unit for connecting the wireless diagnosis communication with the OBD via the antenna; a robot controller that moves the vision sensor to the shooting position via a kinematic attitude control of the robot or returns it to a standby position outside the vehicle; a vision processing unit for analyzing the shooting image of the vision sensor and calculating the current distorted angle with respect to a horizontal line; a controller for recognizing the process entry of the vehicle when the vehicle identification number is received, and inquiring the vehicle type information and the OBD ID matched to the vehicle identification number to connect the diagnosis communication with the OBD; and a database for storing a program and data for the automatic adjustment of the steering wheel of the vehicle.

The vision processing unit may compare a second horizontal line analyzed with the steering wheel pattern on the basis of a first predetermined horizontal line in the shooting image to detect the current distorted angle of the steering wheel.

The vision processing unit may detect the current distorted angle of the steering wheel by intersecting the second horizontal line relative to the first horizontal line present on the dashboard or cluster shape in the shooting image.

The vision processing unit may detect the current distorted angle of the steering wheel by crossing the second horizontal line based on the first horizontal line formed in the shooting image of the vision sensor.

Kinematic attitude information may be set to the robot controller in order to position the vision sensor horizontally at the shooting position to generate the first virtual horizontal line in the shooting image.

The controller may reanalyze the shooting image of the steering wheel photographed through the vision sensor after the center alignment of the steering wheel using the MDPS and verifies whether or not the first horizontal line as a reference and the second horizontal line of the steering wheel coincide.

The controller may re-input the current distorted angle to the steering angle sensor and re-correct the steering angle sensor, when the current distorted angle is detected due to the inconsistency between the first horizontal line and the second horizontal line as the verification result.

An automatic adjustment method for a steering wheel in some forms of the present disclosure provided in a process line to support wheel alignment operation of a vehicle on which an OBD is mounted, may include connecting with the OBD of the vehicle entered into the process line through a wireless diagnosis communication; moving a vision sensor mounted at an end portion of the robot to a shooting position of the steering wheel in the vehicle through a robot attitude control when the vehicle is located in a centering position; analyzing the shooting image of the vision sensor to calculate the current distorted angle of the steering wheel from a reference horizontal line; and inputting the current distorted angle of the steering wheel through the diagnosis communication to a steering angle sensor of the vehicle to correct the steering angle sensor as a current steering angle.

The connecting with the OBD of the vehicle may include recognizing the process line entry of the vehicle when the scanner detects the vehicle identification number; and inquiring the vehicle type information and OBD ID matched to the vehicle identification number, and connecting the wireless diagnosis communication with the OBD based on the OBD ID.

The analyzing the shooting image of the vision sensor may compare a second horizontal line detected in the steering wheel pattern with the first predetermined horizontal line in the shooting image to detect the current distorted angle of the steering wheel.

Generating a correction angle to rotate the current distorted angle of the steering wheel to zero degree after inputting the current distorted angle of the steering wheel and center-aligning the steering wheel by zero degree by transmitting the steering wheel control signal including the correction angle to a MDPS (Motor Driving Power Steering) of the vehicle, may be further included.

The center-aligning the steering wheel may include verifying whether or not the center alignment success to reanalyze the shooting image of the steering wheel photographed through the vision sensor after receiving the center alignment completion response from the vehicle.

The verifying whether or not the center alignment success may include determining that the center alignment fails when the first horizontal line is not matched with the second horizontal line of the steering wheel by comparing the second horizontal line of the steering wheel with respect to the first predetermined horizontal line in the shooting image; and re-correct the current distorted angle between the first horizontal line and the second horizontal line to the steering angle sensor and re-initializing the steering angle sensor.

Maintaining the center alignment state through the MDPS locking of the vehicle during the wheel alignment operation time by requesting the center alignment maintenance to the vehicle after center-aligning the steering wheel, may further included.

The maintaining the center alignment state may include releasing the MDPS locking of the vehicle by transmitting a center alignment release request to the vehicle when the wheel alignment operation is completed.

In some forms of the present disclosure, by detecting the distorted angle of the steering wheel through a vision sensor mounted at the end portion of the robot and by directly inputting the distorted angle to the steering angle sensor and correcting the steering angle sensor, the conventional steering wheel leveling operation can be fully automated, thereby reducing work time, workload and cost.

Furthermore, by directly inputting the current distorted angle to the steering angle sensor, it is possible to prevent human error by manual operation and to prevent the mechanical error due to rotation of the steering wheel, thereby improving the quality of the steering wheel off center. In addition, by supporting the steering wheel alignment in a state of maintaining the center alignment by rotating the steering wheel at 0 degree through the control of the MDPS, it is possible to reduce the whole wheel alignment process time by omitting the mounting and removing process of the conventional wheel leveler.

Further areas of applicability will become apparent form the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 shows the flow chart for a conventional wheel alignment operation.

FIG. 2 schematically shows the configuration of an automatic adjustment system of a steering wheel in one form of the present disclosure.

FIG. 7 is a flowchart outlining the automatic adjustment method of the steering wheel in one form of the present disclosure.

Figure 1:
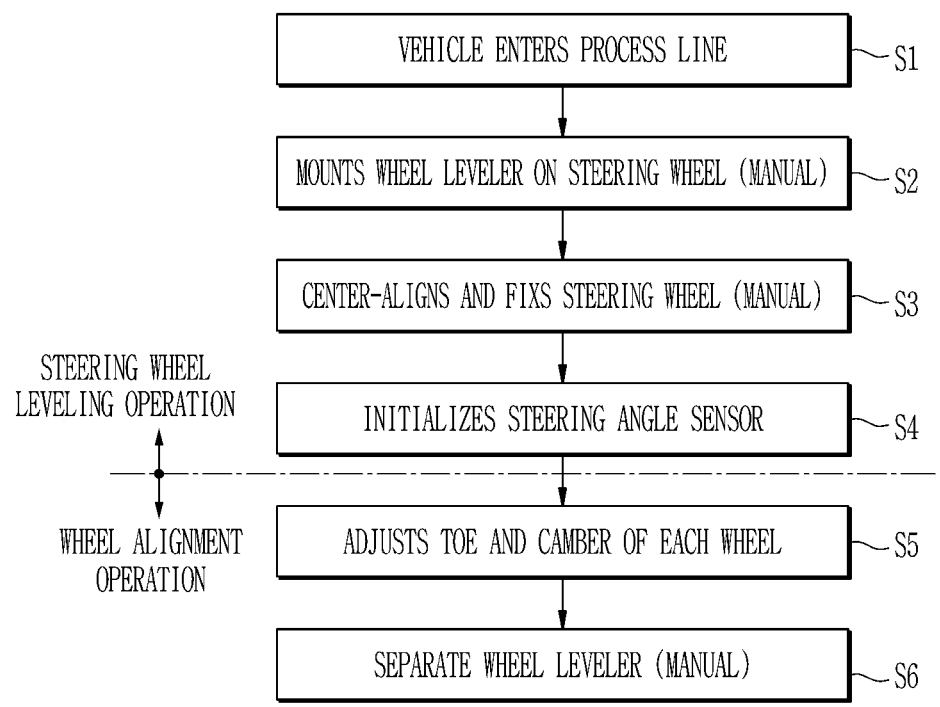

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, some forms of the present disclosure have been shown and described, simply by way of illustration. As those skilled in the art would realize, some forms of the present disclosure may be modified in various different ways, all without departing from the spirit or scope of the present disclosure. Accordingly, the drawings and description are to be regarded as illustrative in nature and not restrictive. Like reference numerals designate like elements throughout the specification. In the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof. Hereinafter, a steering wheel automatic adjustment system and method thereof in some forms of the present disclosure will now be described in detail with reference to drawings.

Figure 2:
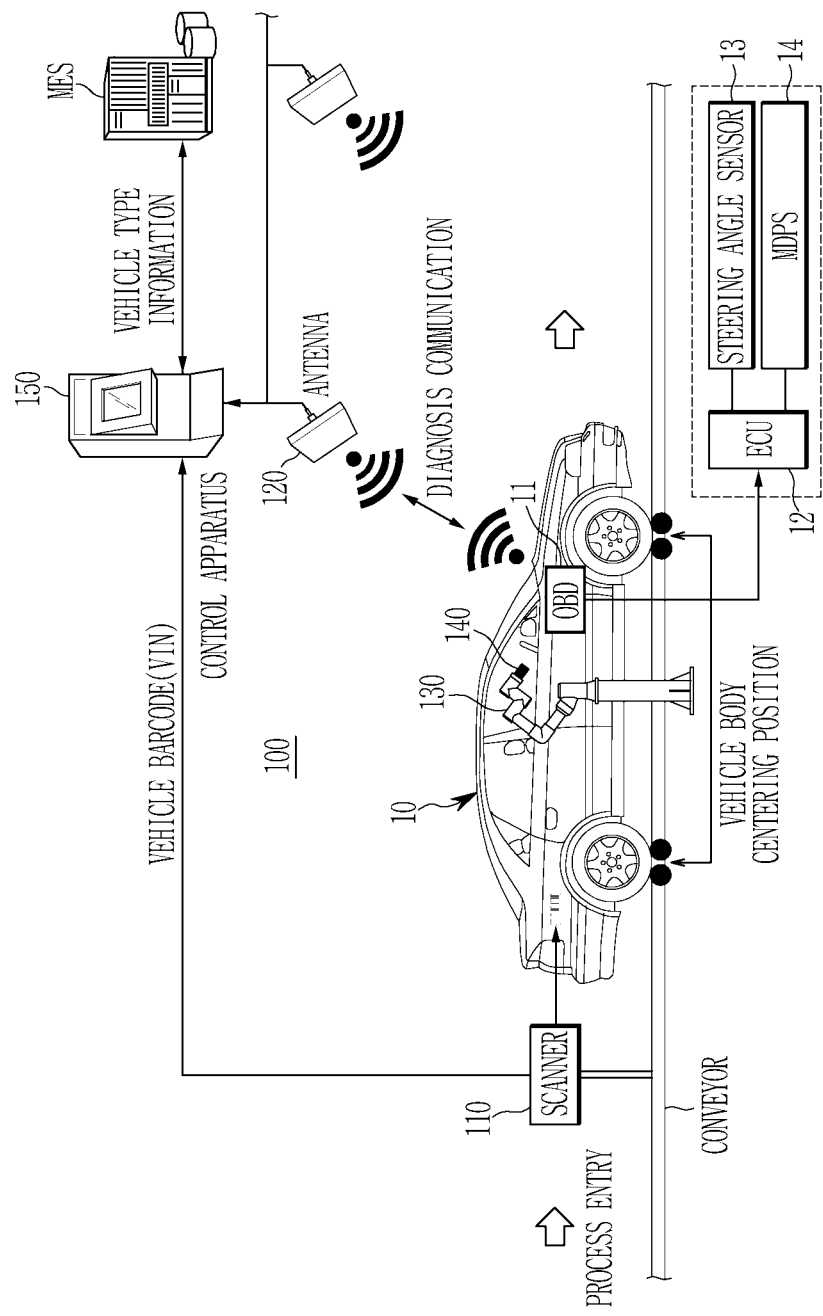

FIG. 2 schematically shows the configuration of an automatic adjustment system of a steering wheel in some forms of the present disclosure.

Referring to FIG. 2, an automatic adjustment system of a steering wheel 100 in some forms of the present disclosure may include a scanner 110, an antenna 120, a robot 130, a vision sensor 140, and a control apparatus 150, which cooperate with a vehicle 10 entering a wheel alignment process.

The vehicle 10 with OBD 11 is assembled through several production lines along the conveyor belt and enters a process line for wheel alignment operation in some forms of the present disclosure.

The vehicle 10 may include an ECU (Electronic Control Unit) 12, a steering angle sensor 13, and a MDPS (Motor Driving Power Steering) 14, which cooperate with the OBD 11 for automatic adjustment of the steering wheel.

The OBD 11 communicates diagnostic communication with the control apparatus 150 via antenna 120 as communication equipment supporting wireless inspection of the vehicle.

The OBD 11 transmits and receives data via the diagnosis communication connected to the control apparatus 150 by using the unique identification information (OBD ID), and may be connected to the ECU 12, the steering angle sensor 13 and the MDPS 14 via diagnostic communication (e.g. CAN) inside the vehicle.

The ECU 12 is an upper controller for controlling various electronic devices installed in the vehicle 10, and may control sub-controller configured for each electronic equipment.

The steering angle sensor 13 may detect a change in the steering angle due to the operation (rotation) of the steering wheel. The steering angle sensor 13 stores the current distorted angle of the steering wheel received from the ECU 12 as a current steering angle and to be corrected with the current distorted angle. This initializes the reference angle for detecting the steering angle change in accordance with the operation of the steering wheel later.

When the steering wheel control signal is received from the ECU 12, the MDPS 14 drives the corresponding motor to align the steering wheel to the 0 degree position and serves to maintain the center alignment during the wheel alignment operation.

The steering wheel control signal may include a correction angle for center alignment by rotating the steering wheel to a position of zero degree by the current distorted angle after the steering angle sensor 13 is corrected.

The scanner 110 obtains the vehicle identification number VIN by recognizing the barcode attached to the vehicle body of the vehicle 10 entering the process line, and transmits the vehicle identification number VIN to the control apparatus 150.

However, the scanner 110 will be described on the assumption of a barcode scanner, but is not limited thereto, and may be configured as a reader for recognizing the RFID or the tag in which the identification information of the vehicle 10 is recorded.

The antenna 120 may be connected with the OBD 11 of the vehicle 10 entering the process line through the wireless diagnostic communication, and relays the data transmitted/received between the control apparatus 150 and the vehicle 10. The antenna 120 may be composed of a directional antenna of short-range communication and disposed at multiple intervals along a conveyor belt on which the vehicle 10 moves.

The robot 130 may be composed of a multi-jointed manipulator provided in a vehicle body centering position, and the robot 130 moves the vision sensor 140 mounted on the tip end thereof to the shooting position of the steering wheel through a predetermined kinematic attitude control.

Figure 3:
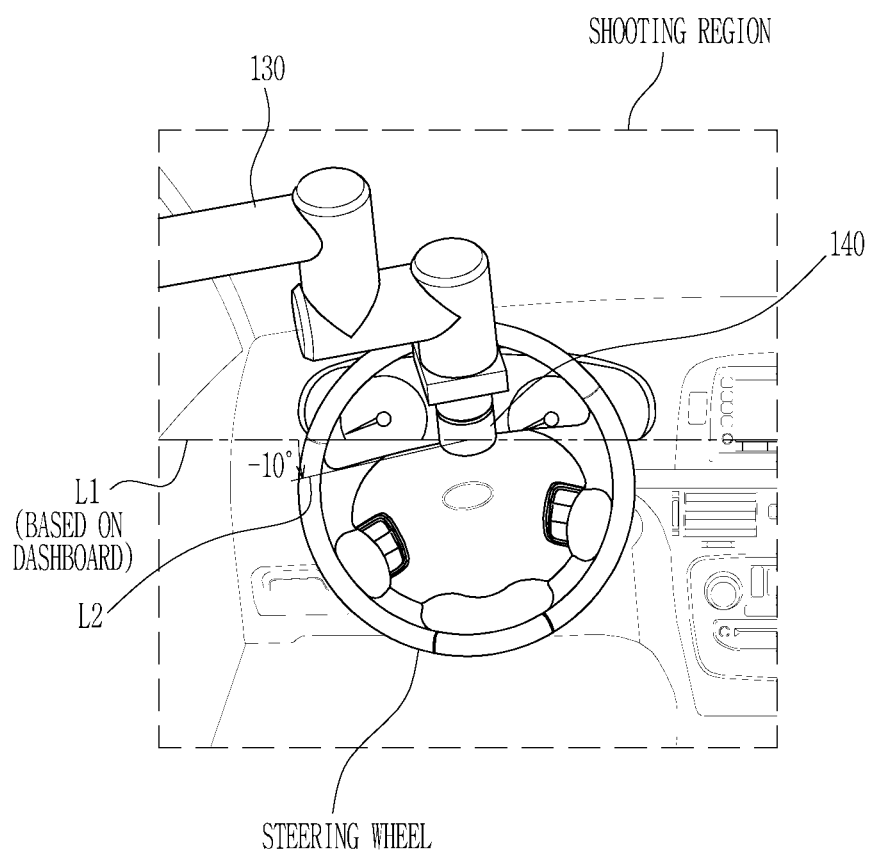
FIG. 3 shows a vision sensor moved to the shooting position by the robot in one form of the present disclosure.

For example, FIG. 3 shows the vision sensor moved to the shooting position by the robot according to the present disclosure.

Referring to FIG. 3, the vision sensor 140 may include a camera and illumination, enter the interior of the vehicle through the driver seat window, and be fixed at a shooting position facing the steering wheel.

The vision sensor 140 analyzes the image photographed at the shooting position and measures the distorted angle of the current steering wheel based on a reference angle (hereinafter, defined as zero) in which the steering wheel is center-aligned.

For example, the vision sensor 140 may detect the current distorted angle of the steering wheel by comparing a second horizontal line L2 formed on the steering wheel with respect to a first horizontal line L1 present in the dashboard shape.

The first horizontal line L1 may be set to some horizontal line (e.g. bottom line) formed in the cluster.

The vision sensor 140 recognizes the steering wheel pattern, which is a symmetrical structure of left and right sides, and compares it with the first horizontal line L1 by creating a second horizontal line L2 that horizontally connects any two symmetrical points on the left and right.

Through this, the vision sensor 140, as shown in FIG. 3, detects the current distorted angle at −10 degree in the left direction of the steering wheel and delivers it to the control apparatus 150.

Figure 4:
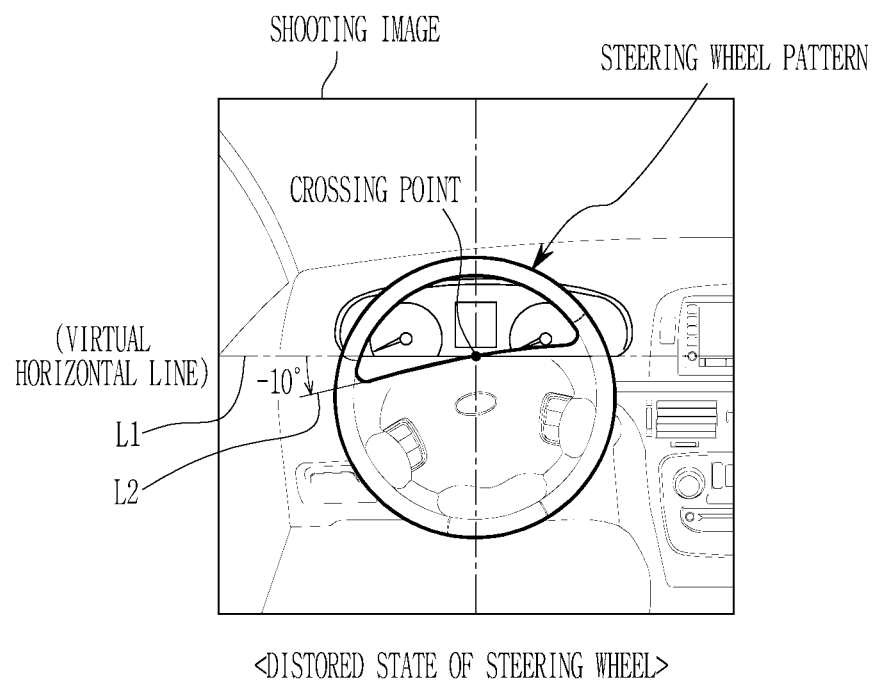
FIG. 4 shows a state of a first imaginary horizontal line set in the shooting image in one form of the present disclosure.

On the other hand, FIG. 4 shows the first imaginary horizontal line in the shoot image in some forms of the present disclosure.

Referring to FIG. 4, some forms of the present disclosure is not limited to the first horizontal line L1 formed on the dashboard and can generate a first virtual horizontal line L1 on the shooting image of the vision sensor 140.

The first horizontal line L1 of the vision sensor 140 intersects at least one point on the second horizontal line L2 formed in the steering wheel, so that it detect the current distorted angle (e.g., −10 degrees) of the steering wheel from the intersection point.

The control apparatus 150 may be composed of a computing system that controls the overall operation for the automatic adjustment of the steering wheel in some forms of the present disclosure.

Figure 5:
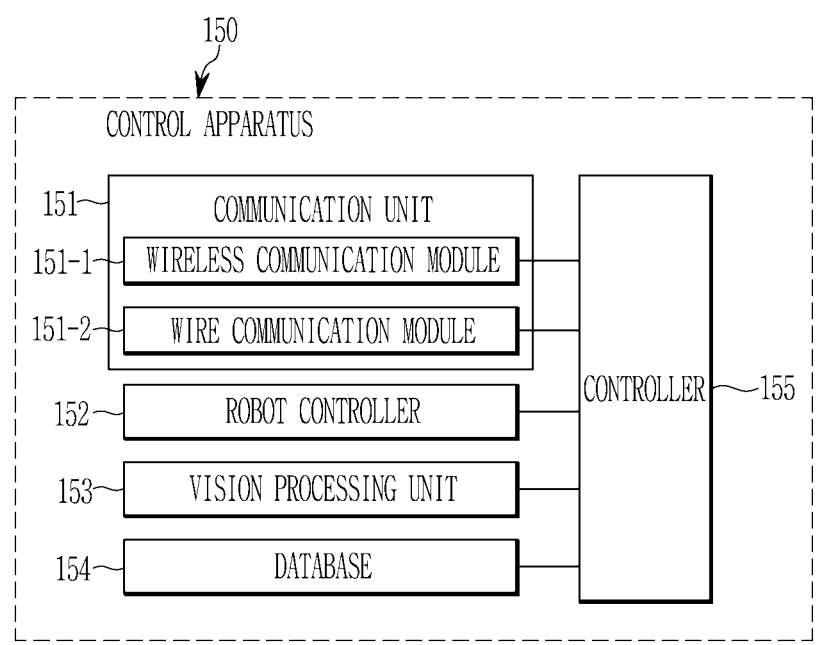
FIG. 5 is a block diagram schematically showing the configuration of a control apparatus in one form of the present disclosure.

FIG. 5 is a block diagram schematically showing the configuration of a control apparatus in some forms of the present disclosure.

Referring to FIG. 5, the control apparatus 150 in some forms of the present disclosure may include a communication unit 151, a robot controller 152, a vision processing unit 153, a controller 154 and a database 155.

The communication unit 151 may include a wireless communication module 151-1 connecting the wireless diagnosis communication with the OBD 11 of the vehicle 10 via the antenna 120 and a wired communication module 151-2 interworking with other systems such as a MES (Manufacturing Execution System) via the internet.

The robot controller 152 stores kinematic setting information for the attitude control of the robot 130, and controls the operation for entering the vision sensor 140 to the shooting position in the vehicle or for retracting to a waiting position outside the vehicle.

The kinematic setting information may be set such that the robot 130 can horizontally position the vision sensor 140 at the shooting position to create the first virtual horizontal line L1 in the shooting image.

The vision processing unit 153 analyzes the image of the steering wheel photographed through the vision sensor 140 to calculate the current distorted angle.

The vision processing unit 153 may detect the current distorted angle of the steering wheel by crossing the second horizontal line L2 analyzed with the steering wheel pattern on the basis of the first horizontal line L1.

The controller 154 is a central processing unit that controls the operation of each part through an algorithm for the automatic adjustment of the steering wheel in some forms of the present disclosure.

The controller 154 recognizes the process entry of the vehicle 10 when the vehicle identification number (VIN) detected by the scanner 110 is received, and inquires the vehicle type information based on the vehicle identification number (VIN) and the OBD ID mounted on the vehicle 10 in the MES (Manufacturing Execution System).

The controller 154 identifies the specifications applied to the vehicle based on the vehicle type information and connects diagnostic communication with OBD 11 of vehicle 10 based on the OBD ID.

Herein, the connection of the diagnosis communication based on the OBD ID means that the controller 154 is connected to the ECU 12, the steering angle sensor 13 and the MDPS 14 in the vehicle 10 via the OBD 11.

The controller 154 transmits the current distorted angle (e.g., −10 degrees) to the ECU 12 of the vehicle 10 via the diagnosis communication when the current distorted angle of the steering wheel in the vehicle 10 is detected through the vision sensor 140 and the vision processing unit 153.

At this time, the ECU 12 inputs the received current distorted angle (e.g., −10 degrees) as the current steering angle of the steering angle sensor 13 to be corrected with the received current distorted angle.

That is, the controller 154 recognizes the pattern of the steering wheel through the vision sensing, recognizes the current distorted angle, and initializes the steering angle sensor 13 by directly inputting the current distorted angle to the steering angle sensor 13.

This has the advantage of eliminating worker's task of manually setting the wheel leveler and turning the steering wheel to zero degree, in contrast to conventional steering wheel leveling operations.

In addition, the conventional steering wheel leveling method has a drawback in which an error occurs in the center alignment operation because a mechanical clearance between a steering wheel, a universal joint column, and a rack-pinion, and the like, is inevitably generated in the process of turning the steering wheel at zero degree.

However, the present disclosure has a merit that can prevent the mechanical error since the current distorted angle is directly input to the steering angle sensor 13 without turning the steering wheel.

On the other hand, after the steering angle sensor 13 is initialized by correction, the controller 154 generates a steering wheel control signal for correcting the current distorted angle to zero degree and transmits the signal to the MDPS 14 of the vehicle 10 via the diagnosis communication to rotate the steering wheel at zero degree.

Figure 6:
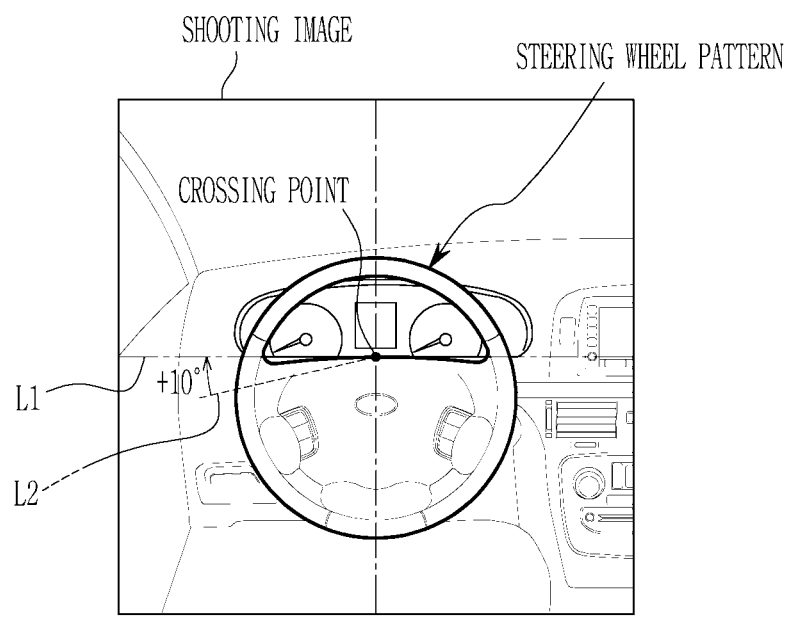
FIG. 6 shows the correction state of the steering wheel in the shooting image in one form of the present disclosure.

For example, FIG. 6 shows the correction state of the steering wheel in the shooting image in some forms the present disclosure.

Referring to FIG. 6, the controller 154 in some forms of the present disclosure may generate the steering wheel control signal for rotating the steering wheel by +10 degrees when the current distorted angle is −10 degrees to transmit it the ECU 12.

At this time, the ECU 12 drives the motor of the MDPS 14 based on the received steering wheel control signal, and center-aligns the steering wheel by rotating the steering wheel to the 0 degree position by +10 degrees.

In addition, the controller 154 may reanalyze the image of the steering wheel photographed through the vision sensor 140 after the steering wheel control using the MDPS 14 is completed to verify whether the first horizontal line L1 and the second horizontal line L2 are matched or not.

As a result of the verification, if the first horizontal line L1 and the second horizontal line L2 are not matched so that the current distorted angle is redetected, the redetected current distorted angle can be re-input to the steering angle sensor 13 to be reinitialized by correction.

For this, the controller 154 fixes the vision sensor 140 to the shooting position until the center alignment control of the steering wheel via the MDPS 14 is completed and returns to the original standby position through the control of the robot 130 if the center alignment verification is successful.

On the other hand, the controller 154 requests the steering wheel center maintenance control to the ECU 12 and maintains the center alignment during the wheel alignment work time through the braking control of the motor of the MDPS 14.

This makes it possible to perform stable wheel alignment without fixing the steering wheel using the conventional wheel leveler.

The database 155 stores a program and data for automatic adjustment of the steering wheel of the control apparatus 150 and stores the data generated according to the operation of the control apparatus 150.

On the other hand, a method of automatically adjusting the steering wheel of a vehicle in some forms of the present disclosure based on the configuration of the automatic adjustment system 100 of a steering wheel described above will be described with reference to a flowchart in which the control apparatus 150 and the vehicle 10 cooperate.

FIG. 7 is a flowchart outlining an automatic adjustment method of a steering wheel of in some forms of the present disclosure.

Referring to FIG. 7, the control apparatus 150 in some forms of the present disclosure recognizes the process entry of the vehicle 10 when the vehicle identification number VIN detected at the scanner 110 is received at step S101.

The control apparatus 150 inquires the vehicle type information and the OBD ID of the vehicle 10 matched with the vehicle identification number VIN and connects the wireless diagnosis communication with the OBD 11 mounted on the vehicle 10 based on the OBD ID at step S102.

At this time, the control apparatus 150 can open the window of the driver seat by transmitting the window open command to the ECU of the vehicle first if the diagnosis communication is connected.

When the vehicle body is positioned at the centering position, the control apparatus 150 moves the vision sensor 140 mounted on the front end portion to the shooting position of the steering wheel in the vehicle through the attitude control of the robot 130 at step S103.

The control apparatus 150 photographs the steering wheel image through the vision sensor 140 at step S104 and analyzes the shooting image to calculate the current distorted angle of the steering wheel from the reference horizontal line at step S105.

At this time, the control apparatus 150 can analyze the shooting image of the vision sensor 140 and detect the current distorted angle of the steering wheel by comparing the second horizontal line L2 detected in the steering wheel pattern based on the first horizontal line L1.

The control apparatus 150 transmits the current distorted angle of the steering wheel through the diagnosis communication and corrects the current steering angle of the steering angle sensor 13 at step S106.

At this time, the steering angle sensor 13 of the vehicle 10 initializes the reference angle for detecting the change of the steering angle by storing the current distorted angle of the steering wheel as the current steering angle at step S107.

When the initialization completion response is received from the vehicle 10, the control apparatus 150 determines that the initialization (correction) of the steering angle sensor 13 of the vehicle 10 is completed.

The control apparatus 150 generates a correction angle for rotating the current distorted angle of the steering wheel to zero degree at step S109, and transmits the steering wheel control signal including it to the vehicle 10 at step S110.

At this time, the vehicle 10 drives the motor of the MDPS 14 based on the received steering wheel control signal to center-align by rotating the steering wheel to the 0 degree position at step S111.

When the center alignment completion response is received from the vehicle 10 at step S112, the control apparatus 150 can reanalyze the image of the steering wheel photographed through the vision sensor 140 to verify whether center alignment is successful or not at step S113.

The control apparatus 150 determines that the center alignment has failed if the second horizontal line L2 of the steering wheel does not coincide with the first horizontal line L1 (at step S113: No), and returns to the step S109 to regenerate the correction angle of the zero degree to perform the process of controlling the steering wheel.

On the other hand, the control apparatus 150 determines that the center alignment verification is successful if the second horizontal line L2 of the steering wheel coincides with the first horizontal line L1 (at step S113; YES) and returns the vision sensor 140 to the original standby position through the control of the robot 130 at step S114.

The above process can be regarded as a waiting process to prepare the wheel alignment W/A process of the vehicle, and the wheel alignment W/A will be described below.

The control apparatus 150 requests maintenance of center alignment with vehicle 10 upon successful verification of the center alignment at step S115.

At this time, the vehicle 10 can be locked so that the steering wheel maintains the center alignment state through the MDPS locking at step S116.

When the MDPS locking completion response is received from the vehicle 10 at step S117, the control apparatus 150 transmits a wheel alignment work start message to the control unit (not shown) of the wheel alignment process to perform the tow and camber adjustment operation at step S118.

Thereafter, the control apparatus 150 transmits a center alignment release request to the vehicle 10 at step S120 when a wheel alignment work completion message is received at the step of at step S119.

At this time, the vehicle 10 releases the MDPS locking at step S121, and responds to the control apparatus 150.

The control apparatus 150 terminates the diagnosis communication connection with the OBD of the vehicle 10 when the MDPS locking release response is received from the vehicle 10 at step S122, and stores the steering wheel adjustment and wheel alignment operation history of the related vehicle in the database 155 at step S122.

Thereafter, the vehicle 10 is moved to the next process.

In some forms of the present disclosure, by fully automating the conventional steering wheel leveling operation through the method of detecting the distorted angle of the steering wheel through the vision sensor mounted at the tip portion of the robot and directly inputting the distorted angle to the steering angle sensor to be initialized, it is possible to reduce work time, workload and cost.

Also, it is possible to prevent the human error due to manual operation by directly inputting the current distorted angle to the steering angle sensor and prevent the mechanical error due to the rotation of the steering wheel, thereby improving the quality of the steering wheel off center.

In addition, by supporting the steering wheel alignment operation in a state of maintaining the center alignment to rotate the steering wheel at 0 degree through MDPS control, it is possible to reduce the process time of whole wheel alignment by eliminating the conventional wheel leveler mounting and removing process.

Although the present disclosure has been described in relation to exemplary forms of the present disclosure, the present disclosure is not limited to the exemplary forms described above, and various other modifications are possible.

For example, in some forms of the present disclosure shown in FIG. 7, it was described that the control apparatus 150 generates a correction angle for rotating the current distorted angle detected through the vision sensor 140 by 0 degree.

However, if the position of the waiting process and the wheel alignment process position are separated, it may be considered that the steering wheel may be distorted during the vehicle has to move to the W/A process position.

Therefore, some forms of the present disclosure are not limited thereto, after successful completion of the center alignment verification, the control apparatus 150 determines the current steering angle of the steering angle sensor 13 through the diagnosis communication and may generate a correction angle as much as the steering angle is changed.

Therefore, even if the steering wheel is distorted during the vehicle moves from the standby process to the W/A process position, the center alignment and maintenance control through the MDPS is possible by grasping the current steering angle of the steering angle sensor 13 without the vision sensor 140.

It is to be understood that the present disclosure is not limited to the apparatus and/or method described above, but may be embodied through a program for realizing functions corresponding to the configuration of the present disclosure and a recording medium or the like on which the program is recorded, and the present disclosure can be easily implemented by those skilled in the art to which the present disclosure belongs based on the description of the above-described exemplary forms of the present disclosure.

The description of the disclosure is merely exemplary in nature and, thus, variations that do not depart form the substance of the disclosure are intended to be within the scope of the disclosure. Such variations are not to be regarded as a departure from the spirit and scope of the disclosure.

DESCRIPTION OF SYMBOLS

100: steering wheel automatic adjustment system
110: scanner
120: antenna
130: robot
140: vision sensor
150: control apparatus
151: communication unit
152: robot controller
153: vision processing unit
154: controller
155: database
10: vehicle
11: ODB
12: ECU
13: steering angle sensor
14: MDPS

What is claimed is:

1. An automatic adjustment system for a steering wheel provided in a process line to support a wheel alignment operation of a vehicle mounted with an On-Board Diagnostics (OBD), comprising:
    memory storing instructions executable to adjust the steering wheel; and
    a controller configured to execute the instructions to:
    recognize a vehicle identification number entered into the process line;
    connect the OBD with a wireless diagnosis communication to transmit and receive data;
    move a vision sensor to a shooting position of the steering wheel through an attitude control when the vehicle is seated in a center position;
    analyze a shooting image of the vision sensor to calculate a current distorted angle of the steering wheel;
    correct a steering angle sensor by inputting the current distorted angle of the steering wheel to the steering angle sensor via the wireless diagnosis communication;
    move the vision sensor to the shooting position of the steering wheel via a kinematic attitude control of the robot or to move the vision sensor to a standby position outside the vehicle;
    analyze the shooting image of the vision sensor;
    calculate the current distorted angle against a horizontal line;
    recognize an entry of the vehicle into the process line when the vehicle identification number is received; and
    check vehicle type information and an OBD ID matched to the vehicle identification number.

2. The system of claim 1, wherein the controller is configured to:
    generate a correction angle of the current distorted angle; and
    rotate the steering wheel through a motor driving power steering (MDPS) control; and
    center-align the steering wheel to a zero degree.

3. The system of claim 2, wherein the controller is configured to lock the MDPS control during the wheel alignment operation of the vehicle to maintain the center-aligned steering wheel.

4. The system of claim 1, wherein the controller is configured to:
    compare a second horizontal line with a first horizontal line in the shooting image of the vision sensor, wherein the second horizontal line is analyzed with a steering wheel pattern; and
    detect the current distorted angle of the steering wheel.

5. The system of claim 4, wherein the controller is configured to:
    detect the current distorted angle of the steering wheel by intersecting the second horizontal line against the first horizontal line that is present on a dashboard or a cluster shape in the shooting image of the vision sensor.

6. The system of claim 4, wherein the controller is configured to detect the current distorted angle of the steering wheel by crossing the second horizontal line against the first horizontal line that is formed in the shooting image of the vision sensor.

7. The system of claim 6, wherein the controller is configured to:
    position the vision sensor horizontally against the shooting position; and
    set kinematic attitude information to generate the first virtual horizontal line in the shooting image of the vision sensor.

8. The system of claim 1, wherein the controller is configured to:
    reanalyze the shooting image of the steering wheel photographed through the vision sensor after center aligning the steering wheel using a motor driving power steering (MDPS) control; and
    determine whether the first horizontal line and the second horizontal line coincide, wherein the first horizontal line is set as a reference line.

9. The system of claim 8, wherein the controller is configured to re-input the current distorted angle to the steering angle sensor when it is determined that the first horizontal line and the second horizontal line do not coincide.

10. An automatic adjustment method for a steering wheel provided in a process line to support a wheel alignment operation of a vehicle mounted with an On-Board Diagnostics (OBD), comprising:
    when the vehicle enters into the process line, connecting with the OBD through a wireless diagnosis communication;
    when the vehicle is in a center position, moving a vision sensor to a shooting position of the steering wheel through a robot attitude control;
    analyzing a shooting image of the vision sensor to calculate a current distorted angle of the steering wheel from a reference horizontal line;
    inputting the current distorted angle of the steering wheel through the wireless diagnosis communication to a steering angle sensor to initialize the steering angle sensor as a current steering angle;
    generating a correction angle of the current distorted angle to rotate the current distorted angle of the steering wheel to a zero degree; and
    center-aligning the steering wheel to the zero degree by transmitting a steering wheel control signal including the correction angle of the current distorted angle to a Motor Driving Power Steering (MDPS) of the vehicle, wherein center-aligning the steering wheel comprises determining a center alignment success by reanalyzing the shooting image of the vision sensor after receiving a center alignment completion response from the vehicle.

11. The method of claim 10, wherein connecting with the OBD through the wireless diagnosis communication comprises:
   when a scanner detects a vehicle identification number, recognizing an entry of the vehicle into the process line;
   checking vehicle type information and an OBD ID matched to the vehicle identification number; and
   connecting the wireless diagnosis communication with the OBD based on the OBD ID.

12. The method of claim 10, wherein analyzing the shooting image of the vision sensor comprises:
   comparing a second horizontal line with a first horizontal line in the shooting image of the vision sensor, wherein the second horizontal line is analyzed with a steering wheel pattern; and
   detecting the current distorted angle of the steering wheel.

13. The method of claim 10, wherein determining the center alignment success comprises:
   when the first horizontal line is not matched with the second horizontal line by comparing the second horizontal line against the first horizontal line in the shooting image, determining that the center alignment success is failed; and
   re-inputting the current distorted angle between the first horizontal line and the second horizontal line to the steering angle sensor and re-initializing the steering angle sensor.

14. The method of claim 10, wherein the method further comprises:
   maintaining a center alignment state through a motor driving power steering (MDPS) locking of the vehicle during the wheel alignment operation by requesting a center alignment maintenance to the vehicle after center-aligning the steering wheel.

15. The method of claim 14, wherein maintaining the center alignment state comprises:
   releasing the MDPS locking of the vehicle by transmitting a center alignment release request to the vehicle when the wheel alignment operation is completed.

* * * * *